United States Patent [19]
Kokubo et al.

[11] 3,723,430
[45] Mar. 27, 1973

[54] METHOD FOR RECLAMATION OF MELAMINE WASTE GAS

[75] Inventors: Ryo Kokubo; Koji Yokomichi; Yasuo Takakuwa; Kozo Takahashi, all of Fuchu, Japan

[73] Assignee: Nissan Chemical Industries Ltd., Tokyo, Japan

[22] Filed: Oct. 28, 1970

[21] Appl. No.: 84,797

[52] U.S. Cl. .........................260/249.7 A, 260/555 A
[51] Int. Cl. .............................................C07d 55/28
[58] Field of Search......260/249.7 A, 249.7 P, 555 A

[56] References Cited

UNITED STATES PATENTS

| | | | |
|---|---|---|---|
| 3,308,123 | 3/1967 | Murata et al. | 260/249.7 |
| 3,492,302 | 1/1970 | Kazuo Abe et al. | 260/249.7 |
| 3,503,970 | 3/1970 | Kanai et al. | 260/249.7 |
| 3,544,628 | 12/1970 | Hsu | 260/249.7 |
| 3,547,919 | 12/1970 | Hamprecht | 260/249.7 |

Primary Examiner—John M. Ford
Attorney—Holcombe, Wetherill & Brisebois

[57] ABSTRACT

Method for utilization of melamine waste gas in high pressure liquid phase melamine synthesis using urea or urea-thermal decomposition product as initial material, — characterized by synthesizing urea under the melamine synthesis pressure directly from melamine waste gas obtained as by-product in the synthesis or, depending on the case, with water or aqueous ammonium carbonate solution added thereto, and introducing the obtained lower pressure urea synthesis solution into decomposing stage of main urea synthesis.

15 Claims, 1 Drawing Figure

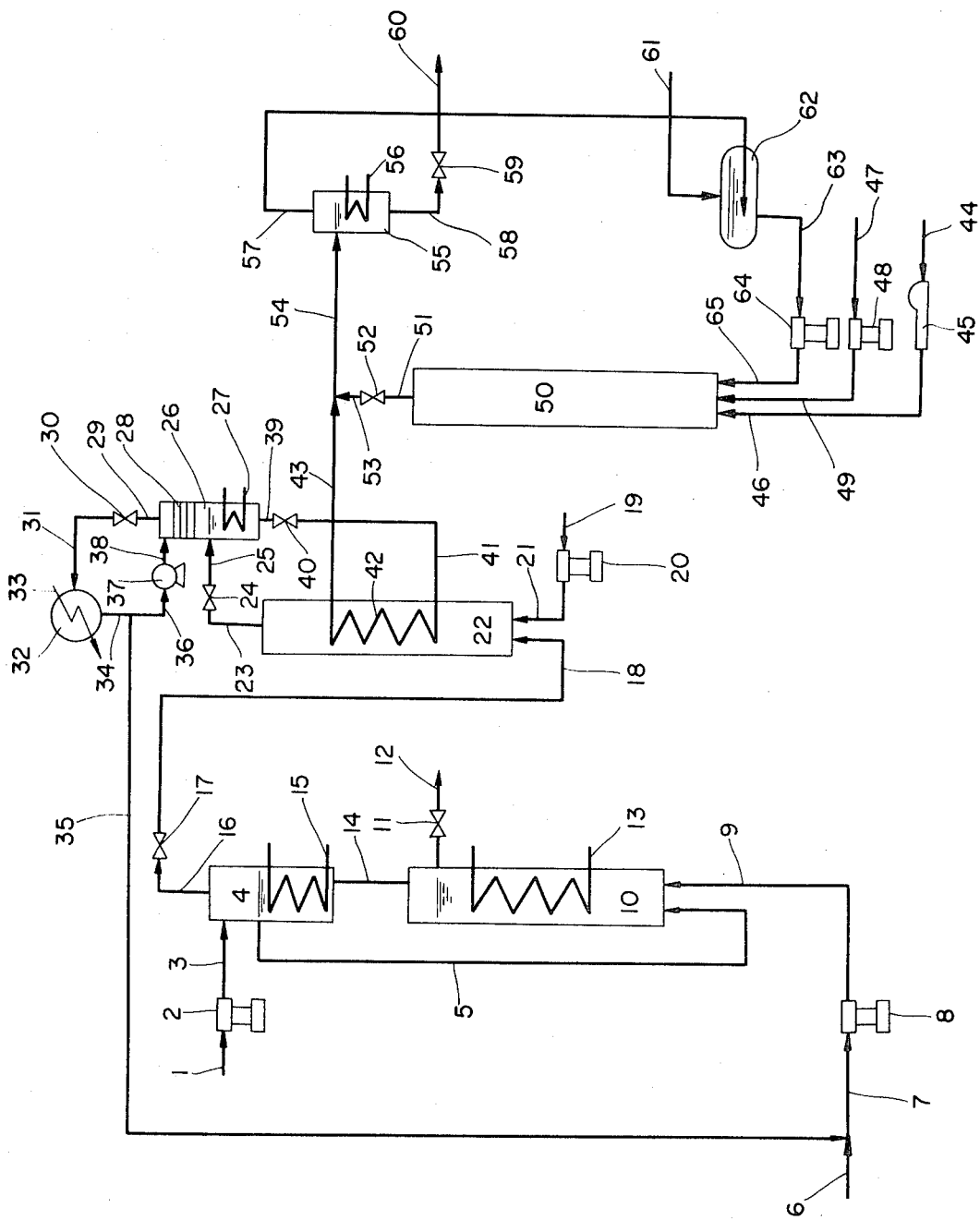

METHOD FOR RECLAMATION OF MELAMINE WASTE GAS

SUMMARY OF THE INVENTION

The present invention relates to a method for utilizing for synthesis of urea the melamine waste gas, i.e., a by-product of melamine synthesis from urea as the initial material under high temperature and high pressure.

In melamine synthesis through thermal decomposition under high temperature, high pressure of urea in the presence of ammonia added, about half the amount of the material, i.e., urea is or decomposed into ammonia and carbonic acid gas, and thereby a large amount of melamine waste gas composed of ammonia and carbonic acid gas including the added ammonia which has not taken part in the reaction is produced as a by-product.

Thus it is a matter of great importance in the industrial production of melamine to make continuous separation and disposal of the melamine waste gas on a large scale and it is no exaggeration to say that the possibility of industrially producing melamine with advantage depends on the success of this disposal.

It is now a widespread practice of disposal to utilize this melamine waste gas as a material for urea synthesis; and for this practice various proposals have been made. Whereas high pressure melamine synthesis usually takes place under a pressure of 50–150 Kg/cm$^2$, urea synthesis does under a pressure of 180–300 Kg/cm$^2$. Therefore, if melamine waste gas is to be utilized for urea synthesis, a special pump or compressor is needed. With no use of a pump or compressor, the volume of urea processing system to receive the melamine waste gas would become larger and the consumption of steam would rise.

For instance, there is a method of first dissolving melamine waste gas in water to produce a stable dilute aqueous solution of carbamate, which is then introduced into a circulation system of still non-reacting in a urea synthesizing process or a method of introducing carbamate in gaseous phase or as slightly pressurized into the same circulation system. In both methods, however, which introduce melamine waste gas not directly into the urea synthesizing tower but into a circulating system of still non-reacting discharged therefrom, the amount of water needed for transforming ammonia and carbonic acid gas in melamine waste gas into stable aqueous solution of carbamate will be greater than the amount of water consumed for urea synthesis itself and this large amount of water, when circulated to the urea synthesizing tower, will lower the efficiency of synthesis, resulting in an increased volume of the decomposition and reclamation system and in an increased unit of steam consumed.

By contrast, when melamine waste gas with a pressure lower than the urea synthesis pressure is compressed up to the urea synthesis pressure by a compressor and then directly introduced into the urea synthesizing tower, no addition of water will be needed and accordingly the urea synthesizing process will be less adversely affected, but a complicated, expensive compressor will be required with various accompanying troubles in operation and maintenance. Thus this method has never been successful; it is essentially impracticable.

Meanwhile, Japanese Patent Publication SHO 44-6273 discloses a new proposal, according to which a waste gas absorbing tank is additionally provided in the circulation system of still non-reacting carbamate between the urea synthesizing tower and the first decomposition stage; melamine waste gas is directly introduced into this tank; and the concentrated aqueous solution of carbamate obtained therefrom is pressure-fed to the urea synthesizing tower. With no need of water addition just like the above-mentioned compressor method, this proposal has no adverse effect on the urea synthesizing process and accordingly is found advantageous.

For the purpose of industrial application of this proposal, however, a pump will be needed to pressure-feed a hot, concentrated aqueous solution of carbamate to the urea synthesizing tower. Technically speaking, such a pump is of course simpler than the above-mentioned compressor, but as compared with an ordinary carbamate pump, this one is slightly less advantageous with respect to mechanism, corrosion, operation, maintenance, etc.

The objective of the present invention is to offer a method for reclaiming melamine waste gas for urea synthesis with no use of any special pump or compressor.

Another objective of the present invention is to offer a method for reclaiming melamine waste gas with far less adverse effect on the urea synthesizing process system which receives it.

The method of the present invention is a method for reclaiming the melamine waste gas by-product in melamine synthesis using urea or the decomposition product of urea in a high pressure liquid phase process, and utilizing said waste gas as material for urea synthesis. Namely, the method of the invention is, in concept, to effectively exploit both the energy offered by high pressure, high temperature by-product waste gas and substances of which said waste gas is made up.

The method of the present application will be generally described below.

After having conducted urea synthesis using melamine waste gas under pressure similar to the melamine synthesis pressure (hereinafter called the low pressure urea synthesis), the reactant product obtained by this synthesis is introduced into an ammonium carbamate decomposer of the urea synthesis system, hereinafter called the high pressure urea synthesis, of which installation is usually arranged in combination with a melamine synthesis system. Out of the high pressure urea synthesizing tower, urea is collected with non-reacting ammonium carbamate being decomposed into CO, NH$_3$ and H$_2$O as separated from urea and being recycled to the high pressure urea synthesizing tower as material used therein. Thus, melamine waste gas is introduced into the high pressure urea synthesis with ease and reduced burden.

This method of the present invention can make highly efficient reclamation of melamine waste gas from a standpoint of heat economy, because in addition to the merit of needing no special pump or compressor this method has another merit of the sensible heat and latent heat of high temperature high pressure melamine waste gas in the low pressure urea synthesizing tower being available for decomposition of still non-reacting carbamate in the low pressure urea synthesis solution or being reclaimable as steam.

For efficient application of the invented method, it is necessary to maintain the rate of synthesis to convert into urea in the low pressure urea synthesizing tower at as high level as possible. Usually the theoretical equilibrium rate of synthesizing reaction in urea synthesis depends on the mol ratios and temperatures of charged ammonia and carbonic acid gas but this is true only when the reactant resides in the synthesizing tower for the time required to reach its reaction equilibrium while the reactant is maintained in liquid phase. In the urea synthesis of the invented method using a pressure lower than the common urea synthesis pressure, the temperature must be lower than the common urea synthesis temperature to maintain the reactant in the synthesizing tower in liquid phase. The reaction rate in urea synthesis drops as the temperature falls; and accordingly the synthesizing tower must be bigger. Naturally there is industrial limitation to the dimensions of the synthesizing tower and the temperature and other charging conditions to assure the highest rate of synthesis should be selected within this industrial limitation.

After various investigations about these conditions, the inventors have discovered the following facts. Namely, for low pressure urea synthesis using a temperature of less than 160°C the reaction rate in urea synthesis is too slow to be practical; thus a temperature of more than 160°C or preferably more than 165°C would be necessary. Meanwhile, $NH_3/CO_2$ (mol ratio) in the composition of melamine waste gas is 2–6 and for efficient urea synthesis from melamine waste gas alone, a pressure of at least 130 Kg/cm$^2$ would be needed. When low pressure urea synthesis is to take place at a pressure of less than 130 Kg/cm$^2$, some addition of water will be needed. For instance, under the conditions: pressure 100 Kg/cm$^2$, $NH_3/CO_2 = 5$ and temperature over 165°C, the reactant cannot be maintained in perfect liquid phase within the low pressure urea synthesizing tower; and the actual attainable rate of synthesis will fall below 50 percent of the theoretical equilibrium rate of synthesis. If water is added to make $H_2O/CO_2$ equal to 1.5, the theoretical equilibrium rate of synthesis may drop but the actual attainable rate of synthesis will rise to over 90 percent of the theoretical equilibrium rate of synthesis. The water added thereby, being carried by the low pressure urea synthesis solution, goes into the first carbamate decomposition stage of the high pressure urea synthesis which receives said low pressure urea synthesis solution; and through the subsequent stages. 20–30 percent of the added water is returned together with ammonia and carbonic acid gas produced by decomposition of carbamate to the reclamation system in the high pressure urea synthesis. The absolute quantity of water added, however, is far less than the quantity of water needed in the conventional method of transforming the whole volume of melamine waste gas into aqueous solution of carbamate and introducing said solution into the circulation system of the high pressure urea synthesis; and therefore the adverse effect on the rate of urea synthesis is small because less added water is advantageous to urea synthesis which is a dehydrating reaction. This increases the yield of urea. Separation of excess ammonia from low pressure urea synthesis solution takes place under the same pressure as the pressure of the first decomposition stage in the high pressure urea synthesis; the obtained ammonia is cooled and condensed to be reused in liquefied form as added ammonia in melamine synthesis.

The description will be explained concerning a preferred embodiment of the invented method.

The synthesis solution discharged from the low pressure urea synthesizing system is introduced into the first ammonium carbamate decomposition stage of the high pressure urea synthesis process, and being made to join the other synthesis solution discharged from the high pressure urea synthesizing tower, being submitted together to two or three steps of ammonium carbamate decomposition under successively stepped-down pressure to obtain the target urea, whereas the still non-reacting carbamate is decomposed into ammonia, carbonic acid gas and a mixed steam gas; and these substances as separated are absorbed into water, ammonia water or aqueous solution of urea to be recirculated for urea synthesis. This so-called solution-circulating method is found appropriate.

Of course it would also be possible to submit only the synthesis solution discharged from the low pressure urea synthesis system to carbamate decomposition, and to process the water, ammonia and carbonic acid gas obtained in accordance with the ordinary solution-circulating method and make urea synthesis using melamine waste gas alone.

The greater the production scale of urea synthesis as compared with that of melamine synthesis, the more advantageous will become the method according to the present invention.

Now to explain the present invention with reference to the attached drawing, urea, i.e., material for melamine synthesis goes in molten state through the duct 1 to the pump 2, where it is pressurized; and then it goes via the duct 3 to the washing tower 4, where the gaseous melamine carried by the melamine waste gas which has been separated from the melamine synthesis solution in the melamine synthesizing tower 10 is brought into contact with the material molten urea, to be absorbed and captured thereby. The molten urea which has dissolved the gaseous melamine overflows out of the washing tower 4 and goes via the duct 5 to the bottom of the melamine synthesizing tower 10. The flow in the duct 5 is a gravity flow caused by the specific gravity difference between liquid and gas.

On the other hand, the added ammonia goes via the ducts 6 7 to the pump 8, where it is pressurized; then passing through the duct 9 it reaches the bottom of the melamine synthesizing tower 10. The weight ratio between urea and added ammonia is 1:0 – 0.5.

The heat necessary for melamine synthesis is supplied from the heating pipe 13 held within the synthesizing tower 10 and thereby the melamine synthesizing temperature is regulated to 350°–450°C. The melamine synthesis solution formed within the melamine synthesizing tower 10 is sent, with the liquid level in the tower maintained constant by the level control valve 11, via the duct 12 to the next stage.

Melamine waste gas generated in the melamine synthesizing tower, being separated from the melamine synthesis solution, goes via the duct 14 to the bottom of the washing tower 4 without being depressured. This melamine waste gas contains 10–30 percent of formed melamine in gaseous form. To extract this melamine, said waste gas is brought into contact with the material molten urea within the washing tower 4. In the washing tower 4, ammonia and carbonic acid gas in the waste gas are partially absorbed by urea in addition to the gaseous melamine being captured. The heat generated thereby is reclaimed as steam by the cooling pipe 15. The temperature of the washing tower is maintained at 150°–240°C or preferably 180°–220°C.

Melamine waste gas now completely devoid of melamine goes via the duct 16 through the pressure control valve 17 — which controls the pressure in the melamine synthesizing tower and the washing tower — and via the duct 18 to the bottom of the low pressure urea synthesizing tower 22. The melamine synthesizing tower and the washing tower are operated at 80–150 Kg/cm².

Water or aqueous ammonium carbonate solution goes via the duct 19 to the pump 20, where it is pressurized; and therefrom it reaches the bottom of the low pressure urea synthesizing tower 22.

The low pressure urea synthesizing tower is operated under the conditions: $NH_3/CO_2 = 2–6$, $H_2O/CO_2 = 0–2.5$, temperature 160°–180°C, pressure 80–150 Kg/cm²; and the rate of urea synthesis in terms of $CO_2$ gas is equal to 40–55 percent. Low pressure urea synthesis solution goes via the duct 23 through the pressure control valve 24 — which controls the pressure of the low pressure urea synthesizing tower — and via the duct 25 to the ammonia-reclaiming tower 26.

Excess heat generated in the low pressure urea synthesizing tower 22 is reclaimed by the heat-reclaiming pipe 42 held within the tower and is utilized to decompose the still non-reacting carbamate which remains in the low pressure urea synthesis solution deprived of excess ammonia, and in some cases may be reclaimed as steam.

When the low pressure urea synthesis solution is stepped down by the pressure control valve 24 from the urea synthesizing pressure to the operation pressure 15–20 Kg/cm² for the ammonia-reclaiming tower, excess $NH_3$ is separated by the sensible heat of this solution. Complete gas-liquid separation takes place at the bottom of the ammonia-reclaiming tower 26; and small quantities of water and carbonic acid gas carried by ammonia are eliminated by circulating the liquefied ammonia through the topmost level of the rack 28 provided at the top of the washing tower. The bottom of the ammonia-reclaiming tower holds a heating pipe 27 which gives a bottom liquid temperature of 115°–125°C and a top gas temperature of 40°–50°C.

Excess ammonia gas completely deprived of water and carbonic acid gas goes via the duct 29 through the pressure control valve 30 — where the pressure of the ammonia-reclaiming tower 26 is controlled — and via the duct 31 to the condenser 32, where it is cooled and condensed by the cooling water 33. The liquefied ammonia obtained goes through the duct 34, one part of it being introduced for recirculation into the top of the ammonia-reclaiming tower via the duct 36, the pump 37 and the duct 38, and the rest passing through the duct 35 and joining the added ammonia in the duct 6 for reuse.

The low pressure urea synthesis solution devoid of excess ammonia goes via the duct 39 through the level control valve 40, which controls the liquid level at the bottom of the ammonia-reclaiming tower, and via the duct 41 to the heat-reclaiming pipe 42. In this pipe 42, part of the still non-reacting carbamate in the low pressure urea synthesis solution is decomposed; and in mixed phase of gas and liquid it goes through the duct 43 and joins the synthesis solution flow 53 discharged from the high pressure synthesizing system; and is introduced via the duct 54 into the first decomposer 55.

Meanwhile, the material carbonic acid gas is introduced via the duct 44 through the compressor 45, where it is compressed, and via the duct 46; and the material ammonia is introduced via the duct 47 through the pump 48, where it is pressurized, and via the duct 49, respectively into the bottom of the high pressure urea synthesizing tower 50.

The high pressure urea synthesizing tower 50 is operated at temperature 180°–210°C and pressure 180–300 Kg/cm². Formed urea synthesis solution goes via the duct 51 through the pressure control valve 52, which controls the synthesizing pressure, and via the duct 53 to the duct 43, where it joins the low pressure urea synthesizing flow; and therefrom via the duct 54, this flow is introduced into the first carbamate decomposer into ammonia and carbonic acid gas 55. The greater part of still non-reacting carbamate, when heated to 140°–160°C by the heating pipe 56 located at the bottom of the first carbamate decomposer into ammonia and carbonic acid gas 55, is decomposed and separated from the urea solution; and goes via the duct 57 to the first condenser 62. Urea synthesis solution deprived of the greater part of decomposed still non-reacting carbamate goes via the duct 58 through the level control valve 59, which controls its level, and via the duct 60 successively to the second and third carbamate decomposers, where the still non-reacting carbamate is fully decomposed and separated, producing an aqueous solution of urea.

The aqueous solution of carbamate formed in the second and third carbamate condensers (omitted from the drawing) corresponding to the second and third decomposers goes via the duct 61 to the first condenser 62, where it absorbs the decomposed gas produced in the first decomposer; a highly concentrated carbamate thus obtained is circulated via the duct 63 through the pump 64, where it is pressurized, and via the duct 65 to the high pressure urea synthesizing tower 50. The first carbamate decomposer into ammonia and carbonic acid gas 55 and the first condenser 62 are operated at pressure 15–20 Kg/cm².

Example 1

Synthesis was made from 29 Kg/hr of urea and 8.2 Kg/hr of liquefied ammonia at temperature 400°C, pressure 140 Kg/cm², yielding 10 Kg/hr melamine; thereby melamine waste gas of 200°C composed of 16.4 Kg/hr of $NH_3$ and 10.6 Kg/hr of $CO_2$ ($NH_3/CO_2 = 4$) was obtained. This melamine waste gas as it was introduced into the low pressure area synthesizing tower for urea synthesis under the conditions: temperature 165°C, pressure 135 Kg/cm², residence time 2 hr. As the result, urea synthesis solution composed of 7.2 Kg/hr of urea, 12.3 Kg/hr of $NH_3$, 5.3 Kg/hr of $CO_2$ and 2.2 Kg/hr of $H_2O$ was yielded. Thereby the rate of synthesis in terms of $CO_2$ turned out 50 percent. This synthesis solution was introduced into the ammonia-reclaiming tower operated under the conditions: pressure 18 $Kg/cm^2$, tower top temperature 50°C, tower bottom temperature 120°C, where 4 Kg/hr of liquefied ammonia was reclaimed, 3 Kg/hr of which was then recirculated to the tower top.

Urea synthesis solution deprived of excess ammonia (urea 7.2 Kg/hr, $NH_3$ 8.3 Kg/hr, $CO_2$ 5.3 Kg/hr, $H_2O$ 2.2 Kg/hr) was introduced into the first carbamate decomposer in the high pressure urea synthesis system according to the method of circulating a solution of urea 200 Kg/hr, for reclamation.

Example 2

Synthesis was made from urea 29 Kg/hr and liquefied ammonia 12 Kg/hr at temperature 400°C, pressure 105 $Kg/cm^2$, yielding melamine 10 Kg/hr; and it was accompanied by melamine waste gas of 200°C composed of $NH_3$ 20.2 Kg/hr, $CO_2$ 10.6 Kg/hr ($NH_3/CO_2 = 5$). As the result of low pressure urea synthesis from this melamine waste gas and water 6.5 Kg/hr under the conditions: temperature 170°C, pressure 105 $Kg/cm^2$, residence time 2 hr, urea synthesis solution composed of urea 6.9 Kg/hr, $NH_3$ 16.4 Kg/hr, $CO_2$ 5.5 Kg/hr and $H_2O$ 8.6 Kg/hr was obtained, the rate of synthesis on $CO_2$ basis being 48 percent. The obtained synthesis solution was introduced into the ammonia-reclaiming tower operated at pressure 20 $Kg/cm^2$, tower top temperature 52°C and tower bottom temperature 125°C; and as the result, liquefied ammonia 6 Kg/hr was reclaimed, of which 4 Kg/hr was then recirculated to the tower top.

Urea synthesis solution devoid of excess ammonia (urea 6.9 Kg/hr, $NH_3$ 10.4 Kg/hr, $CO_2$ 5.5 Kg/hr, $H_2O$ 8.6 Kg/hr) was introduced into the first decomposer of the main urea synthesis system according to the method of circulating a solution of urea 200 Kg/hr, for reclamation.

What is claimed is:

1. A method of using melamine waste gas from a melamine synthesis process which uses urea or thermal decomposition products of urea to form the melamine, comprising
   1. using the melamine waste gas without substantially changing its pressure as a reactant in a low pressure urea synthesizing reactor which is maintained at a pressure that is about the same as the pressure in the melamine synthesis reactor;
   2. then passing the urea synthesis solution reaction product obtained from the low pressure urea synthesizing reactor into an ammonium carbamate decomposition stage used in combination with a high pressure urea synthesis tower.

2. The method of claim 1, in which water or aqueous ammonium carbonate solution is also added to said low pressure urea synthesizing reactor.

3. The method of claim 1 in which excess ammonia is separated by distillation from said reactant product obtained in said low pressure urea synthesizing reactor prior to the introduction of said reactant product into the ammonium carbamate decomposition stage.

4. The method of claim 1, in which said ammonium carbamate decomposition is preliminarily effected by making use of heat generated within the low pressure urea synthesizing reactor, prior to introduction of said reactant product into the ammonium carbamate decomposition stage.

5. The process of claim 1 in which the pressure in the melamine reactor and in the low pressure urea synthesizing reactor are 80–150 $Kg/cm^2$.

6. The process of claim 5, in which the pressure in the ammonium carbamate decomposition stage is 15–20 $Kg/cm^2$ and the pressure in the high pressure urea synthesis tower is 180–300 $Kg/cm^2$.

7. Method of reclamation of melamine waste gas as claimed in claim 1 in which the low pressure urea synthesis temperature is more than 160°C.

8. Method for reclamation of melamine waste gas as claimed in claim 7 in which $MH_3/CO_2$ (mol) in the composition of melamine waste gas is 2–6.

9. Method for reclamation of melamine waste gas as claimed in claim 7 in which in case of low pressure urea synthesis from melamine waste gas alone, a pressure of at least 130 $Kg/cm^2$ is maintained.

10. Method for reclamation of melamine waste gas as claimed in claim 7 in which some addition of water is needed when low pressure urea synthesis is carried out at a pressure of less than 130 $Kg/cm^2$.

11. Method for reclamation of melamine waste gas as claimed in claim 7 in which separation of excess ammonia from low pressure urea synthesis solution is carried out under the same pressure as the pressure of the first decomposition stage in main urea synthesis and the obtained ammonia is cooled and condensed to be reused in liquidified form as added ammonia in melamine synthesis.

12. Method for reclamation of melamine waste gas produced in high pressure liquid phase melamine synthesis using urea or urea-thermal decomposition product as initial material, — characterized by separating said melamine waste gas from the melamine synthesis solution under the same pressure as the melamine synthesis pressure, synthesizing urea under the melamine synthesis pressure directly from the obtained melamine waste gas, or depending on the case, with addition of water or aqueous ammonium carbonate solution, separating excess ammonia from the resulting low pressure urea synthesis solution, introducing the low pressure urea synthesis solution deprived of excess ammonia into the first decomposition stage of urea synthesis, and the separated excess ammonia being recycled to the melamine synthesis system.

13. Method for reclamation of melamine waste gas as claimed in claim 12 in which the urea is synthesized directly from melamine waste gas.

14. Method for reclamation of melamine waste gas as claimed in claim 12 in which the urea is synthesized with addition of water from the melamine waste gas.

15. Method for reclamation of melamine waste gas as claimed in claim 12 in which the urea is synthesized with addition of aqueous ammonium carbonate solution from the melamine waste gas.

* * * * *